United States Patent [19]

Yamamoto et al.

[11] 4,443,514
[45] Apr. 17, 1984

[54] MAGNETIC RECORDING MEDIUM

[75] Inventors: Nobuyuki Yamamoto, Shizuoka; Yasuo Nishikawa; Yuji Andou, both of Kanagawa; Kyoichi Naruo; Tsutomu Okita, both of Shizuoka, all of Japan

[73] Assignee: Fuji Photo Film Co., Ltd., Kanagawa, Japan

[21] Appl. No.: 347,618

[22] Filed: Feb. 10, 1982

[30] Foreign Application Priority Data

Feb. 10, 1981 [JP] Japan .................................. 56-18508

[51] Int. Cl.$^3$ .............................................. G11B 5/72
[52] U.S. Cl. .................................... 428/216; 360/134; 360/135; 360/136; 427/131; 427/132; 428/336; 428/425.8; 428/463; 428/464; 428/694; 428/695; 428/900
[58] Field of Search ............... 428/694, 695, 900, 336, 428/425.8, 216, 463, 464; 427/131, 132; 360/134, 135, 136; 252/62.54

[56] References Cited

U.S. PATENT DOCUMENTS

| | | | |
|---|---|---|---|
| 4,241,139 | 12/1980 | Kubota et al. | 428/480 |
| 4,307,156 | 12/1981 | Yanagisawa | 428/900 |
| 4,309,482 | 1/1982 | Suzuki et al. | 428/695 |
| 4,333,985 | 6/1982 | Shirahata et al. | 428/694 |

FOREIGN PATENT DOCUMENTS 53-20204  6/1978  Japan .................................. 427/131

*Primary Examiner*—Ellis P. Robinson
*Attorney, Agent, or Firm*—Sughrue, Mion, Zinn, Macpeak and Seas

[57] ABSTRACT

A magnetic recording medium having a thin magnetic metal film formed on a non-magnetic base is disclosed. A thin film of a copolymer having vinylidene chloride and acrylonitrile as repeating units is formed on either the thin magnetic metal film or the surface of the base opposite the thin magnetic metal film or both. The resulting magnetic recording medium has improved running properties, wear resistance and electro-to-magnetic conversion characteristics.

14 Claims, No Drawings

MAGNETIC RECORDING MEDIUM

FIELD OF THE INVENTION

The present invention relates to a magnetic recording medium using a thin magnetic film as a magnetic recording layer, and more particularly, to a magnetic recording medium of thin metal film type having good running properties, wear resistance and electro-to-magnetic conversion characteristics.

BACKGROUND OF THE INVENTION

Most conventional magnetic recording media are the coated type which is produced by dispersing particles of magnetic oxides or ferromagnetic alloys such as $\gamma$-$Fe_2O_3$, Co-doped $\gamma$-$Fe_2O_3$, $Fe_3O_4$, Co-doped $Fe_3O_4$, a Berthollide compound of $\gamma$-$Fe_2O_3$ and $Fe_3O_4$ and $CrO_2$ in an organic binder such as a vinyl chloride/vinyl acetate copolymer, a styrene/butadiene copolymer, an epoxy resin or polyurethane resin. The resulting coating solution is applied to a non-magnetic base, followed by drying the coating. However, due to the recent increasing demand for higher density recording, researchers' attention has been drawn to magnetic recording media of thin metal film type that uses as a magnetic recording layer a thin ferromagnetic metal film that is formed by the vapor deposition such as vacuum vapor deposition, sputtering or ion plating, or the plating such as electroplating or electroless plating. Various efforts are being made to use such recording medium on a commercial scale.

Most of the magnetic recording media of the coated type use a metal oxide with small saturation magnetization as a magnetic material. Therefore, an attempt to achieve high-density recording by using a thinner magnetic recording medium results in a decreased signal output. By using a magnetic recording medium of thin metal film type, a very thin magnetic recording layer can be formed by applying a ferromagnetic metal having a greater saturation magnetization than that of the magnetic oxide without using a non-magnetic material such as binder. This thinness is very advantageous for providing good electro-to-magnetic conversion characteristics. However, the thin metal film type magnetic recording medium has its own problems: (1) it develops friction against the magnetic head, guide poles or other transport means when it is run to record, reproduce or erase magnetic signals, and hence wears easily; (2) it is easily attacked by corrosive environments; and (3) the magnetic recording layer may be damaged by impacts during handling.

Some attempts have been made to solve these problems by forming a protective layer on the magnetic recording medium of the thin metal film type. One such proposal is described in Japanese Patent Application (OPI) No. 75001/75 (the term "OPI" as used herein refers to a "published unexamined Japanese patent application") wherein a thin lubricant layer is formed on the metal film. According to this proposal, the coefficient of friction between the magnetic head or guide poles and the metal film is reduced to provide a tape that runs consistently and which is the least likely to be abraded. However, these advantages are quickly lost if the tape is used repeatedly. Another method is described in Japanese Patent Application (OPI) Nos. 39708/78 and 40505/78 wherein a lubricant protective layer made of a metal or metal oxide is formed on the thin metal film, but even in this case, the effect of the protective layer does not last long and as the tape is used repeatedly, the friction coefficient increases rapidly or the thin magnetic metal film breaks. Still another method is described in Japanese Patent Application (OPI) No. 155010/79 wherein an overcoat of a high molecular film is formed on the metal film. However, if the overcoat is made of vinylidene chloride/acrylic ester copolymer and other known high molecular substances, the resulting film thickness is at least about $0.2\mu$ and this causes spacing loss which in turn leads to reduced output in high density recording.

To achieve high density recording, most thin magnetic metal films are supported on a very smooth base. However, regardless of how smooth the base surface is, none of the lubricating methods described above can provide a magnetic recording medium having good running properties, especially in very humid atmospheres, or high wear resistance.

SUMMARY OF THE INVENTION

Therefore, one object of the present invention is to provide a magnetic recording medium of thin metal film type that has good running properties, wear resistance and electro-to-magnetic conversion characteristics.

Another object of the present invention is to provide a magnetic recording medium of thin metal film type that retains good running properties and wear resistance for an extended period of time.

The present inventors have found that these objects of the present invention can be achieved by forming a thin film of a copolymer containing vinylidene chloride and acrylonitrile as repeating units on either the thin magnetic metal film or the surface of the non-magnetic base opposite the thin magnetic metal film or both. The resulting magnetic recording medium has good electro-to-magnetic conversion characteristics, running properties, wear resistance and great abrasion-proofness, and these properties last for an extended period. The present inventors have also found that better results are obtained by forming a lubricant layer on the thin copolymer film.

The thin magnetic metal film used in the present invention can be formed by vapor deposition or plating. Vapor deposition is preferred since it can rapidly form the desired thin metal film, involves simple manufacturing steps, and requires no effluent treatment. The vapor deposition is a process in which a substance or its compound is heated in a vacuum enclosure until its vapor or ionized vapor condenses on the surface of a substrate. Variations of this process include vacuum vapor deposition, sputtering, ion plating and chemical vapor phase plating.

The magnetic recording layer used in the present invention is a thin film that is formed by vapor deposition or plating of a ferromagnetic metal such as iron, cobalt or nickel, or a ferromagnetic alloy such as Fe—Co, Fe—Ni, Co—Ni, Fe—Si, Fe—Rh, Co—P, Co—B, Co—Si, Co—V, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—Na, Co—Ni—Ce, Co—Ni—Zn, Co—Ni—Cu, Co—Ni—W, Co—Ni—Re, or Co—Sm—Cu. The thickness of the layer (the thin magnetic metal film) as used in a magnetic recording medium is preferably in the range of from 0.05 to 2 $\mu$m, more preferably from 0.1 to 0.4 $\mu$m.

The copolymer containing vinylidene chloride and acrylonitrile as repeating units and which is formed on either the thin magnetic metal film or the base or both according to the present invention preferably has a molecular weight of at least 5,000, more preferably 10,000 or more. The copolymerization ratio is preferably such that acrylonitrile is at least 10% and vinylidene chloride is at least 50%, the balance being another component, and more preferably, acrylonitrile is at least 15%, vinylidene chloride is at least 70%, with the balance being another component. The third component to be copolymerized with vinylidene chloride and acrylonitrile may be any monomer that has at least one addition-polymerizable unsaturated bond. Examples of such addition-polymerizable unsaturated compound are acrylic esters, acrylamides, methacrylic esters, methacrylamides, allyl compounds, vinyl ethers, vinyl esters, vinyl heterocyclic compounds, N-vinyl compounds, styrenes, crotonic acids, itaconic acids, and olefins. More specific examples are as follows:

Acrylic acids such as acrylic acid, acrylate esters (e.g., ethyl acrylate, propyl acrylate, butyl acrylate, amyl acrylate, ethyl hexyl acrylate, octyl acrylate, t-octyl acrylate, 2-methoxyethyl acrylate, 2-butoxyethyl acrylate, 2-phenoxyethyl acrylate, chloroethyl acrylate, hydroxyethyl acrylate, cyanoethyl acrylate, hydroxypropyl acrylate, dimethyl aminoethyl acrylate, 2,2-dimethylhydroxypropyl acrylate, 5-hydroxypentyl acrylate, diethylene glycol monoacrylate, trimethylolpropane monoacrylate, pentaerythritol monoacrylate, glycidyl acrylate, 2-hydroxy-3-chloropropyl acrylate, benzyl acrylate, methoxybenzyl acrylate, furfuryl acrylate, tetrahydrofurfuryl acrylate, and phenyl acrylate);

methacrylic acids such as methacrylic acid, methacrylate (e.g., methyl methacrylate, ethyl methacrylate, propyl methacrylate, isopropyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, sulfopropyl methacrylate, N-ethyl-N-phenylaminoethyl methacrylate, ethylene glycol monomethacrylate, 2-hydroxyethyl methacrylate, 3-hydroxypropyl methacrylate, 2-hydroxypropyl methacrylate, 4-hydroxybutyl methacrylate, 5-hydroxypentyl methacrylate, 2,2-dimethyl-3-hydroxypropyl methacrylate, diethylene glycol monomethacrylate, trimethylolpropane monomethacrylate, pentaerythritol monomethacrylate, glycidyl methacrylate, 2-methoxyethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate and naphthyl methacrylate);

acrylamides such as acrylamide, N-substituted acrylamides (e.g., methyl acrylamide, ethyl acrylamide, propyl acrylamide, isopropyl acrylamide, butyl acrylamide, t-butyl acrylamide, heptyl acrylamide, t-octyl acrylamide, cyclohexyl acrylamide, benzyl acrylamide, hydroxymethyl acrylamide, methoxyethyl acrylamide, dimethylaminoethyl acrylamide, hydroxyethyl acrylamide, phenyl acrylamide, hydroxyphenyl acrylamide, tolylacrylamide, naphthyl acrylamide, dimethyl acrylamide, diethyl acrylamide, dibutyl acrylamide, diisobutyl acrylamide, diacetone acrylamide, methylbenzyl acrylamide, benzyloxyethyl acrylamide, β-cyanoethyl acrylamide, acryloyl morpholine, N-methyl-N-acryloyl piperazine, N-acryloyl piperidine, acryloyl glycine, N-(1,1-dimethyl-3-hydroxybutyl)acrylamide, N-β-morpholinoethyl acrylamide, N-acryloylhexamethyleneimine, N-hydroxyethyl-N-methylacrylamide, and N-2-acetamidoethyl-N-acetyl acrylamide);

methacrylamides such as methacrylamide, N-substituted methacrylamides (e.g., methyl methacrylamide, t-butyl methacrylamide, t-octyl methacrylamide, benzyl methacrylamide, cyclohexyl methacrylamide, phenyl methacrylamide, dimethyl methacrylamide, diethyl methacrylamide, dipropyl methacrylamide, hydroxyethyl-N-methyl methacrylamide, N-methyl-N-phenyl methacrylamide, and N-ethyl-N-phenyl methacrylamide);

allyl compounds such as allyl esters (e.g., allyl acetate, allyl caproate, allyl caprylate, allyl laurate, allyl palmitate, allyl stearate, allyl benzoate, allyl acetoacetate, and allyl lactate), allyl ethoxyethanol, allyl butyl ether, allyl glycidyl ether and allyl phenyl ether);

vinyl ethers (e.g., methyl vinyl ether, butyl vinyl ether, hexyl vinyl ether, octyl vinyl ether, decyl vinyl ether, ethyl hexyl vinyl ether, methoxyethyl vinyl ether, ethoxyethyl vinyl ether, chloroethyl vinyl ether, 1-methyl-2,2-dimethylpropyl vinyl ether, 2-ethyl butyl ether, hydroxyethyl vinyl ether, diethylene glycol vinyl ether, dimethyl aminoethyl vinyl ether, diethyl aminoethyl vinyl ether, butyl aminoethyl vinyl ether, benzyl vinyl ether, tetrahydrofurfuryl vinyl ether, vinyl phenyl ether, vinyl tolyl ether, vinyl chlorophenyl ether, vinyl-2,4-dichlorophenyl ether, vinyl naphthyl ether, and vinyl anthranyl ether);

vinyl esters, such as vinyl acetate, vinyl propionate, vinyl butyrate, vinyl isobutyrate, vinyl dimethyl propionate, vinyl ethyl butyrate, vinyl valerate, vinyl caproate, vinyl chloroacetate, vinyl dichloroacetate, vinyl methoxy acetate, vinyl butoxyacetate, vinyl phenyl acetate, vinyl acetoacetate, vinyl lactate, vinyl-β-phenyl butyrate, vinyl cyclohexyl carboxylate, vinyl benzoate, vinyl salicylate, vinyl chlorobenzoate, vinyl tetrachlorobenzoate and vinyl naphthoate;

vinyl heterocyclic compounds such as maleic anhydride, N-vinyl oxazolidone, vinyl pyridine, vinyl picoline, N-vinyl imidazole, N-vinyl pyrrolidone, N-vinyl carbazole, vinyl thiophene and N-vinyl ethyl acetamide;

styrenes such as styrene, methyl styrene, dimethyl styrene, trimethyl styrene, ethyl styrene, diethyl styrene, isopropyl styrene, butyl styrene, hexyl styrene, cyclohexyl styrene, decyl styrene, benzyl styrene, chloromethyl styrene, trifluoromethyl styrene, ethoxymethyl styrene, acetoxymethyl styrene, methoxy styrene, 4-methoxy-3-methyl styrene, dimethoxy styrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethyl styrene, 4-fluoro-3-trifluoromethyl styrene, vinyl benzoic acid, and methyl vinyl benzoate); crotonic acids such as crotonic acid, crotonic acid amide, crotonic acid esters (e.g., butyl crotonate, hexyl crotonate, and glycerine monocrotonate);

vinyl ketones such as methyl vinyl ketone, phenyl vinyl ketone, and methoxyethyl vinyl ketone);

olefins such as dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,6,6-trimethyl-1-heptene, 1-dodecene and 1-octadecene; itaconic acids (e.g., itaconic acid, itaconic anhydride, methyl itaconate, and ethyl itaconate), crotonic acids (e.g., crotonic acid, methyl crotonate, and ethyl crotonate), sorbic acid, cinnamic acid, methyl sorbate, glycidyl sorbate, citraconic acid, chloroacrylic acid, mesaconic acid, maleic acid, fumaric acid, methacrylic acid, halogenated olefins excluding vinylidene chloride (e.g., vinyl chloride and isoprene chloride), and unsaturated nitriles excluding acrylonitrile (e.g., methacrylonitrile). These monomers may be used either alone or in combination. To modify the physical properties of the surface of the magnetic recording medium, about 0.2 to 30 wt% of polymers such as cellulose derivatives, polyurethanes, and vinyl polymers may be added as required. If the amount of these polymers is too great, a highly wear-resistant tape that is one object of the present invention cannot be produced.

The objects of the present invention are achieved more effectively by forming a lubricant layer on the thin copolymer film. Suitable lubricants include aliphatic acids, metal soaps, aliphatic acid amides, aliphatic acid esters, mineral oils, vegetable oils, animal oils such as whale oil, higher alcohols, and silicone oil; fine, electrically conductive particulate materials such as graphite; fine inorganic particulate materials such as molybdenum disulfide and tungsten disulfide; fine particles of plastics such as polyethylene, polypropylene, polyethylene/vinyl chloride copolymer and polytetrafluoroethylene; α-olefin polymers; unsaturated aliphatic hydrocarbons that are liquid at ordinary temperatures (i.e., those compounds having an n-olefin double bond attached to a terminal carbon atom, with about 20 carbon atoms), fluorocarbons and mixtures thereof. Aliphatic acids, metal soaps, aliphatic acid amides, aliphatic acid esters, higher alcohols and mixtures thereof are preferred, and aliphatic acids having 10 or more carbon atoms are particularly preferred.

In addition to the lubricant, a corrosion inhibitor or a mold inhibitor which is well-known in the art (for example, as described in Japanese Patent Application (OPI) Nos. 63494/76 and 41204/78, and Japanese Patent Application No. 26880/79) may be used as desired.

A thin film of the copolymer containing vinylidene chloride and acrylonitrile as repeating units can be formed on either the thin magnetic metal film or the non-magnetic base or both by a suitable method. For example, it may be formed by applying a solution of the copolymer dissolved in an organic solvent onto the base and drying the same, or by applying an emulsion of said polymer and drying the same. The concentration of the coating solution is preferably in the range of from 0.05 to 5 wt%, and said solution is applied to the base in such an amount that the dry thickness of the film is preferably in the range of from 5 to 1,000 Å, more preferably from 10 to 500 Å, most preferably from 20 to 200 Å. The thus thin film of the copolymer material is preferably formed on both the thin magnetic metal film and the non-magnetic base opposite the thin magnetic metal film. In this case, since the both surfaces have small dynamic friction coefficient, the good effect in the running properties, wear resistance and great abrasionproofness can be obtained to the both surfaces.

After the thin copolymer film is formed by the methods described above, a lubricant layer may be formed by applying a solution of the lubricant dissolved in an organic solvent onto the thin copolymer film, or by the vapor deposition process described before.

Examples of the organic solvent used for application of the copolymer containing vinylidene chloride and acrylonitrile as repeating units, as well as the lubricant include ketones such as acetone, methyl ethyl ketone, methyl isobutyl ketone and cyclohexanone; alcohols having 1 to 10 carbon atoms such as methanol, ethanol, propanol and butanol; esters such as methyl acetate, ethyl acetate, butyl acetate, ethyl lactate, and glycol acetate monoethyl ether; ether and glycol ethers such as glycol dimethyl ether, glycol monoethyl ether and dioxane; hydrocarbons such as pentane, hexane, heptane, octane, nonane and decane; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene.

The lubricant is generally used in a dry weight of from 2 to 100 mg/m$^2$, preferably from 2 to 50 mg/m$^2$, more preferably from 2 to 20 mg/m$^2$.

The recording medium of the present invention achieves the following advantages:

(1) When it is used on a tape deck, it experiences only a small increase in the dynamic friction coefficient. This means, the medium is very stable to repeated running properties and has very high wear resistance;

(2) The medium retains high stability to repeated running properties even when it has a very smooth thin magnetic metal film and base;

(3) The medium has small dynamic friction coefficient and runs smoothly in humid atmospheres; and (4) The film of the copolymer containing vinylidene chloride and acrylonitrile as repeating units is very thin and is covered with a very small amount of lubricant, so it does not reduce the electro-to-magnetic conversion characteristics of the magnetic recording medium of thin metal film type in which it is used. The copolymer film is only slightly susceptible to corrosive attack under humid conditions and causes no reduction in the electro-to-magnetic conversion characteristics.

The present invention is now described in greater detail by reference to the following example and comparative examples which are given here for illustrative purposes only and are by no means intended to limit the scope of the invention. In the example and comparative examples, all parts are by weight.

EXAMPLE 1

A magnetic cobalt film (0.2μ thick) was formed on a polyethylene terephthalate film (20μ thick) by oblique deposition. Electron beams were used to condense the vapor of cobalt (99.95% purity) which was directed onto the PET film at an angle of incidence of 70° at a pressure of $5 \times 10^{-5}$ Torr. A polymer coating solution I of the formulation indicated below was applied onto the Co film and the base film in a dry thickness of 100 Å and was dried at 30° C. for 10 seconds to provide a magnetic tape A.

| Polymer Coating Solution I | |
|---|---|
| Vinylidene chloride/acrylonitrile copolymer (copolymerization ratio in moles: 8/2, Saran Resin F-310 of Asahi-Dow Ltd. having a BL viscosity of ca. 80 cPs for solids cont. of 20% as measured in methyl ethyl ketone at 25° C.) | 1.0 part |
| Methyl ethyl ketone | 200 parts |

A lubricant coating solution II of the formulation indicated below was applied onto the copolymer film of the magnetic tape A in a weight of 10 mg/m² and dried at 50° C. for 10 seconds. The dried film was slit into a video tape ½ inch wide which was referred to as Sample No. 1.

| Lubricant Coating Solution II | |
|---|---|
| Myristic acid | 1.0 part |
| n-Hexane | 200 parts |

COMPARATIVE EXAMPLE 1

A video tape was prepared as in Example 1 except that a Co magnetic film was simply formed on a PET base by oblique deposition without forming a copolymer film or a lubricant layer. The tape was referred to as Sample C-1.

COMPARATIVE EXAMPLE 2

A video tape ½ inch wide was prepared as in Example 1 except that the polymer coating solution I was replaced by a polymer coating solution III of the following formulation. The tape was referred to as Sample C-2.

| Polymer Coating Solution III | |
|---|---|
| Vinylidene chloride/acrylate ester copolymer | 1.0 part |
| Methyl ethyl ketone | 200 parts |

COMPARATIVE EXAMPLE 3

A video tape ½ inch wide was prepared as in Example 1 except that only a lubricant coating solution II was applied to the base. The tape was referred to as Sample C-3.

The four samples were subjected to the following film durability (wear resistance) test and measurement of dynamic friction coefficient.

(1) Durability Test

Durability of a magnetic thin film was determined when pressing a magnetic tape against a magnetic head at a tension of 90 g/½ inch, and reciprocating at 38 cm/sec 500 times. The number of abrasions that were formed on the tape surface was counted visually.

(2) Measurement of Dynamic Friction Coefficient

The magnetic tape was reciprocated on a VHS video tape recorder (Maclord 88, Model NV-8800, of Matsushita Electric Industrial Co., Ltd.) once, 20 times, 100 times and 500 times, and the change in the dynamic friction coefficient ($\mu$) was examined by the formula $T_2/T_1 = e^{\mu\pi}$ wherein $T_1$ was the tape tension at the supply side of the rotary cylinder and $T_2$, at the take-up side.

The test and measurement results are shown in Table 1. As for the surface of the base, only measurement of dynamic friction coefficient (2) was conducted with the tape of Example 1 and that of Comparative Example 1. The surfaces of the respective bases were referred to as Sample No. 2 and C-4. The results are also shown in Table 1.

TABLE 1

| Sample No. | Sliding Face | Polymer Film | Lubricant | (1) Abrasions after 500 Reciprocations | (2) Change in Dynamic Friction Coefficient | | | |
|---|---|---|---|---|---|---|---|---|
| | | | | | 1 (recip.) | 20 | 100 | 500 |
| 1 | Magnetic surface | Vinylidene chloride and acrylonitrile | Myristic acid | No abrasion | 0.29 | 0.30 | 0.32 | 0.34 |
| 2 | Base surface | Vinylidene chloride and acrylonitrile | Myristic acid | — | 0.30 | 0.30 | 0.31 | 0.35 |
| C-1 | Magnetic surface | — | — | More than 10 deep abrasions | 0.48 | 0.55 | 0.58 | 0.67 |
| C-2 | Magnetic surface | Vinylidene chloride and acrylic ester | Myristic acid | 4 or 5 shallow abrasions | 0.31 | 0.38 | 0.42 | 0.50 |
| C-3 | Magnetic surface | — | Myristic acid | More than 10 deep abrasions | 0.30 | 0.33 | 0.41 | 0.48 |
| C-4 | Base surface | — | — | — | 0.35 | 0.40 | 0.57 | 0.59 |

As the data in Table 1 show, the magnetic recording medium of thin metal film type according to the present invention has very good running properties and wear resistance. Furthermore, the improvement in these properties is kept for an extended period of time. For this reason, the medium is a product having high commercial value.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
    a non-magnetic support base;
    a thin magnetic metal film formed on a surface of said non-magnetic support base; and
    a thin film containing in at least 70 weight percent a copolymer material formed on said thin magnetic metal film, said copolymer material containing 50% or more vinylidene chloride and 10% or more acrylonitrile as repeating units.

2. A magnetic recording medium as claimed in claim 1, further containing a thin film of at least 70 weight percent of copolymer material containing 50% or more vinylidene chloride and 10% or more acrylonitrile as repeating units formed on a surface of said support base opposite to said surface upon which said thin magnetic metal film is formed.

3. A magnetic recording medium as claimed in any of claims 1 or 2, further comprising a lubricant layer formed on a surface of said thin film of copolymer material.

4. A magnetic recording medium as claimed in claim 3, wherein said lubricant is selected from the group consisting of aliphatic acid, metal soap, aliphatic acid amide, and aliphatic acid ester, a higher alcohol and mixtures thereof.

5. A magnetic recording medium as claimed in claim 4, wherein said lubricant is an aliphatic acid having 10 or more carbon atoms.

6. A magnetic recording medium as claimed in any of claims 1 or 2, wherein said thin magnetic metal film has a thickness within the range of 0.05 to 2 μm.

7. A magnetic recording medium as claimed in claim 6, wherein said thickness is within the range of 0.1 to 0.4 μm.

8. A magnetic recording medium as claimed in any of claims 1 or 2, wherein said copolymer material has a molecular weight of 5,000 or more.

9. A magnetic recording medium as claimed in any of claims 1 or 2, wherein said copolymer material has a molecular weight of 10,000 or more.

10. A magnetic recording medium as claimed in claim 9, wherein said copolymer material is comprised of 15% or more acrylonitrile and 70% or more vinylidene chloride.

11. A magnetic recording medium as claimed in any of claims 1 or 2, wherein an outermost surface of said magnetic recording medium contains 0.2 to 30 wt% of a polymer selected from the group consisting of cellulose derivatives, polyurethanes, or vinyl polymers.

12. A magnetic recording medium as claimed in any of claims 1 or 2, wherein said thin film of copolymer material is applied in such an amount that the dry thickness of said material is within the range of 5 to 1,000 Å.

13. A magnetic recording medium as claimed in claim 12, wherein said thickness is within the range of 10 to 500 Å.

14. A magnetic recording medium as claimed in claim 13, wherein said thickness is within the range of 20 to 200 Å.

* * * * *